Oct. 7, 1924.  
J. R. LE CLAIR  
1,510,786  
AUTOMOBILE ATTACHMENT  
Filed July 30, 1923  
2 Sheets-Sheet 1
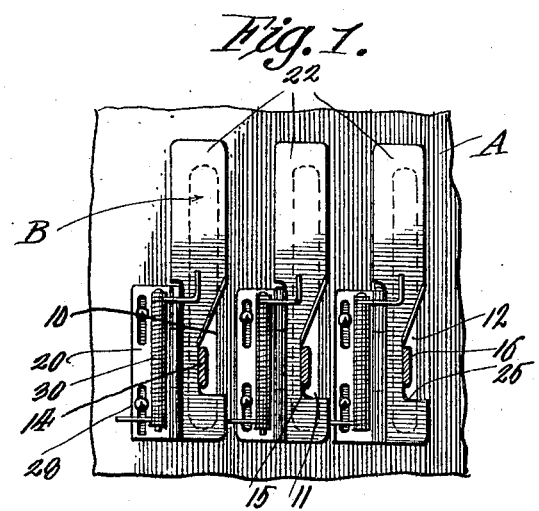
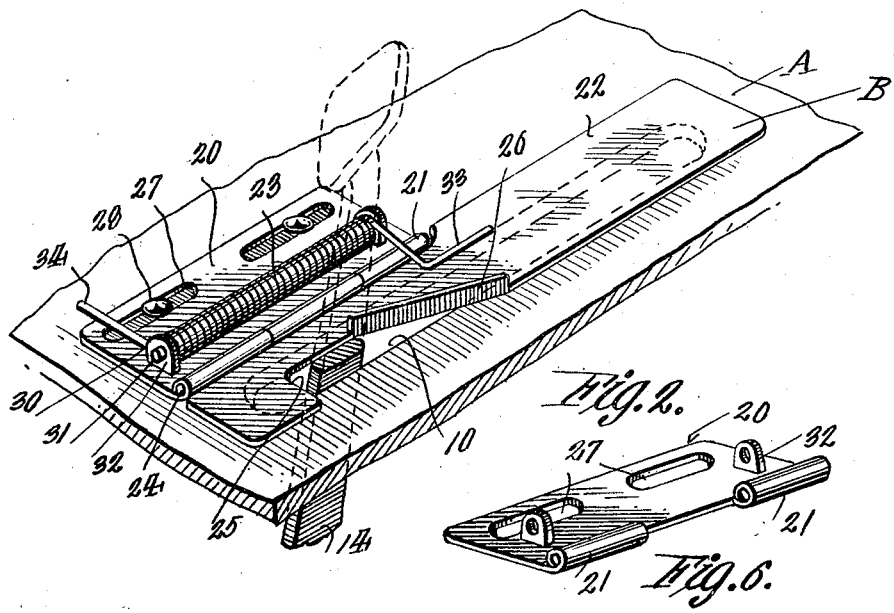
WITNESSES  
Guy M. Spring  
George W. Wright
Inventor  
JOSEPH R. LE CLAIR  
By Richard B. Owen  
Attorney Oct. 7, 1924.  
J. R. LE CLAIR  
1,510,786  
AUTOMOBILE ATTACHMENT  
Filed July 30, 1923  
2 Sheets-Sheet 2
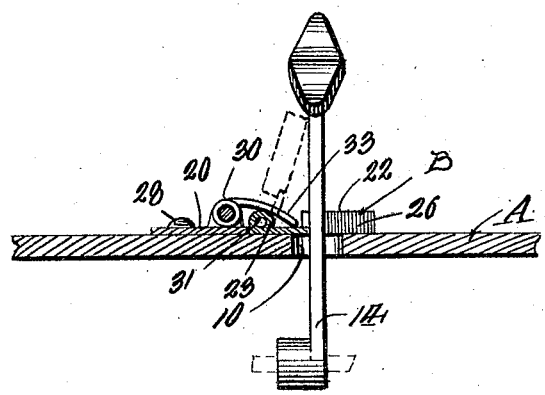
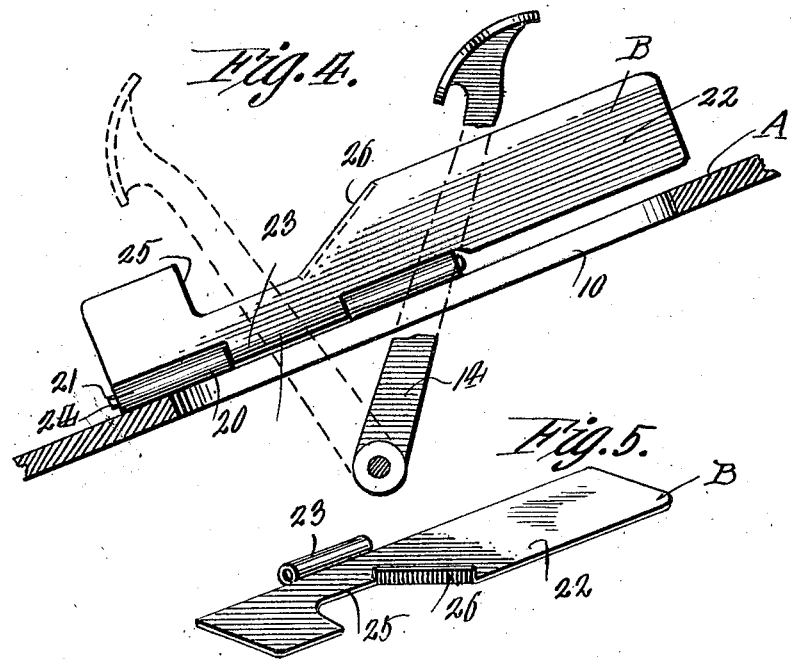
WITNESSES
Inventor  
JOSEPH R. LE CLAIR
By Richard B. Owen  
Attorney Patented Oct. 7, 1924.

1,510,786

UNITED STATES PATENT OFFICE.

JOSEPH RICHARD LE CLAIR, OF WYANDOTTE, MICHIGAN.

AUTOMOBILE ATTACHMENT.

Application filed July 30, 1923. Serial No. 654,773.

*To all whom it may concern:*

Be it known that I, JOSEPH R. LE CLAIR, a citizen of the United States, residing at Wyandotte, in the county of Wayne and State of Michigan, have invented certain new and useful Improvements in an Automobile Attachment, of which the following is a specification.

This invention comprehends vital improvements in automobiles and the primary object of the invention is to provide novel means for preventing a draft through the slots in the foot boards of an automobile provided for the brake, clutch and reverse foot pedals, thereby adding to the comfort of winter driving.

Another prime object of the invention is to provide a novel pivoted shutter plate for each slot in the foot board of an automobile provided for the brake, clutch and reverse foot pedals, the shutter plate being of a novel construction, and adapted to be automatically opened upon movement of the foot pedals in a forward direction, so as to permit the free use of the said levers or pedals.

A further prime object of the invention is to provide a novel shutter plate for the clutch, brake and reverse foot pedal slots of a foot board of an automobile which can be initially adjusted according to the normal position of the foot pedal with which it is associated.

A still further object of the invention is to provide an improved device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a plan view of the improved shutter plate showing the same incorporated with the foot boards of an automobile, the brake, clutch and reverse levers being shown in section.

Figure 2 is an enlarged fragmentary perspective view showing one of the improved shutter plates incorporated with the foot board of an automobile.

Figure 3 is a transverse section through the foot board of an automobile showing the improved shutter plate incorporated therewith.

Figure 4 is a vertical longitudinal section through the foot board of an automobile showing one of the improved shutter plates incorporated therewith and illustrating the raised position of the plate during the operation of one of the foot pedals or levers.

Figure 5 is a detail perspective view of one of the shutter plates, and

Figure 6 is a detail perspective view of the attaching plate for supporting the shutter plates.

Referring to the drawings in detail, wherein similar reference characters designate corresponding parts throughout the several views, the letter A generally indicates the foot board of an automobile, which is provided with the usual longitudinally extending slots 10, 11 and 12 for the reception of the clutch, reverse and brake foot pedals 14, 15 and 16 respectively.

Each of the slots 10, 11 and 12 is provided with means generally indicated by the reference character B for normally preventing a draft through the slots and thereby add to the comfort of winter driving.

The means B provided for each slot comprises an attaching plate 20 preferably formed of sheet metal or the like and the inner edge of the attaching plate 20 is rolled to provide a hinge barrel 21. This attaching plate 20 carries a closure or shutter plate 22 and the inner edge of this shutter plate 22 at one end thereof is provided with companion hinge barrels 23 for aligning with the hinge barrels 21 and a pintle 24 is placed through the aligned hinge barrels, so that the shutter plate 22 will be pivotally supported by the attaching plate 20. The outer edge of each shutter plate 22 is provided with a notch 25 through which the clutch, reverse or brake foot pedal is adapted to extend and it can be seen that the forward wall of the notch 25 extends at an angle to the longitudinal axis of the shutter plate and this wall is provided with an upturned flange 26 against which the foot pedal is adapted to abut during forward sliding movement thereof. The notch 25 is only made of a sufficient size as to conveniently receive the lever or pedal which protrudes through the foot board.

The shutter plate 22 is of such a size as to fully cover the slot with which it is associated and the attaching plate 20 is provided with longitudinally extending slots 27 for the reception of headed fastening elements 28 carried by the foot board A. By this construction, it can be seen that the attaching plate 20 can be slid longitudinally of the slot in the foot board to permit the initial adjustment of a closure or shutter plate 22 in relation to the foot pedal with which it is associated.

In order to normally hold the closure or shutter plate over its slot, an expansion spring 30 is provided, which is coiled about a suitable hinge shaft 31 supported by ears 32 formed on the attaching plate 20. One end of this spring 30 engages the shutter or closure plate 22 as at 33, while the opposite end of the spring engages the attaching plate 20 as at 34. By this construction it is obvious that the shutter plate will be normally held in firm contact with the upper surface of the foot board A over the said slot.

Now it can be seen that when the forward movement is imparted to any one of the foot pedals, that the same will engage the inclined flange 26 and open the shutter plate 22 and thus permit free forward movement of the pedals.

When the pedals are returned to their normal positions, the shutter plates will snatch back into their closed position by means of the spring heretofore described.

From the foregoing description, it can be seen that I have provided an exceptionally simple and durable device for preventing a draft through the slots in a foot board of an automobile provided for the clutch, reverse and brake foot pedals.

Changes in details may be made without departing from the spirit or the scope of this invention.

What I claim as new is:

1. The combination with a foot board of an automobile having a plurality of slots therein for the reception of the clutch, reverse and brake foot pedals of an automobile, of means for preventing a draft through the slot including a hinge shutter plate for each plate, an attaching plate carrying the shutter plate, and means for adjustably securing the attaching plate to the floor boards.

2. The combination with a foot board of an automobile having longitudinally extending slots therethrough for the reception of the clutch, reverse and brake foot pedals, of means for preventing a draft through said slots, said means including an attaching plate adjustably secured adjacent to one edge of each slot, a closure plate hingedly connected to each attaching plate for normally closing the slot having a notch therein for the reception of the pedal and spring means for normally holding the closure plate over said slot.

3. As a new article of manufacture, a device for eliminating draft through the slots in the foot board of an automobile comprising an attaching plate having longitudinally extending slots therethrough, fastening elements arranged to extend through said slots, a closure plate hingedly connected at one edge to the attaching plate, a notch in said closure plate for the reception of the foot pedal of the automobile extending through said slots, one wall of the slots being extended at an angle to the longitudinal axis of the closure plate, a flange formed on said wall, a coil spring carried by the attaching plate having one end engaging the attaching plate and the opposite end engaging the closure plate.

In testimony whereof I affix my signature in presence of two witnesses.

JOSEPH RICHARD LE CLAIR.

Witnesses:
 OVID O. DROUILLARD,
 EDMUND T. DROUILLARD.